(No Model.) 3 Sheets—Sheet 1.

T. C. DARBY & J. E. STEEVENSON.
IMPLEMENT FOR CULTIVATING LAND.

No. 466,663. Patented Jan. 5, 1892.

Attest
Walter Tamarisy
Walter Allen

Inventors:
Thomas Churchman Darby.
John Evan Steevenson.

By Knight Bros
Attys.

THE NORRIS PETERS CO., PHOTO-LITHO., WASHINGTON, D. C.

(No Model.) 3 Sheets—Sheet 2.

T. C. DARBY & J. E. STEEVENSON.
IMPLEMENT FOR CULTIVATING LAND.

No. 466,663. Patented Jan. 5, 1892.

Attest
Walter Tamariss
Walter Allen

Inventors:
Thomas Churchman Darby.
John Evan Steevenson.
By Knight Bros
Attys.

(No Model.) 3 Sheets—Sheet 3.
T. C. DARBY & J. E. STEEVENSON.
IMPLEMENT FOR CULTIVATING LAND.
No. 466,663. Patented Jan. 5, 1892.
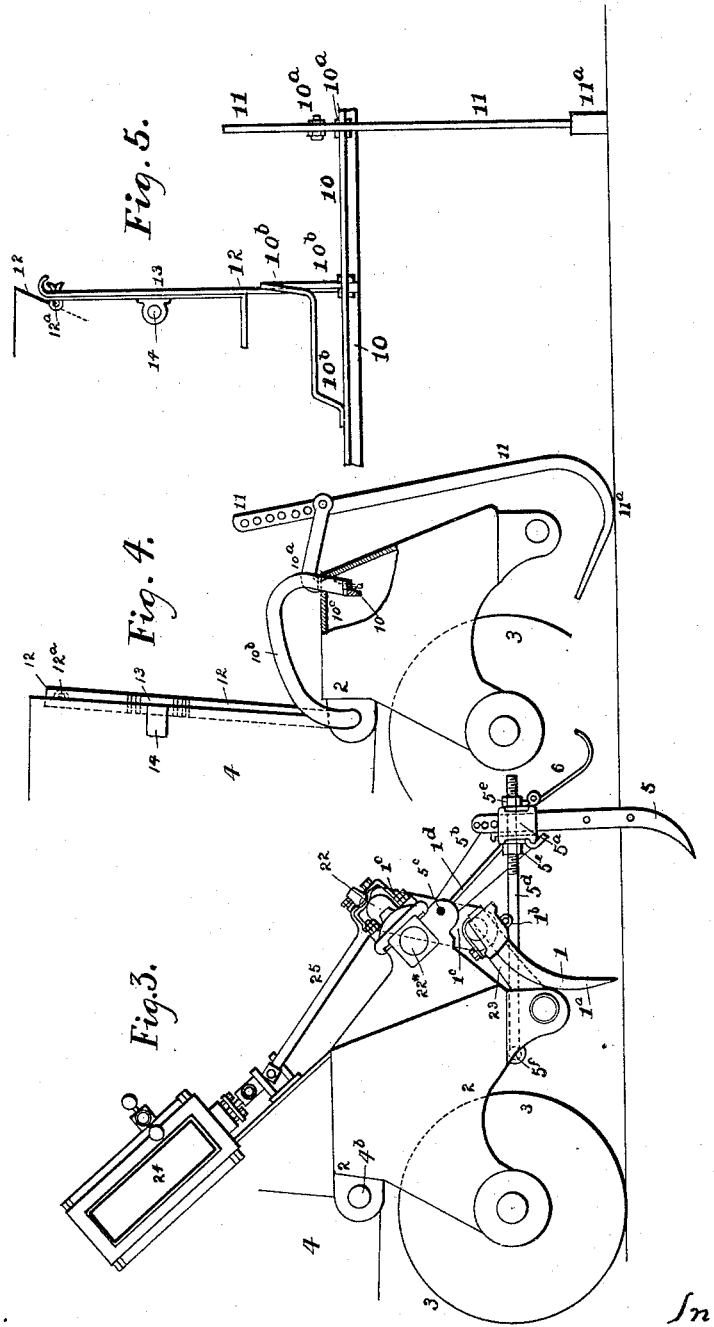
Attest:
Walter Jamaries
Walter Allen
Inventors:
Thomas Churchman Darby.
John Evan Steevenson.
By Knight Bros.
Attys.

UNITED STATES PATENT OFFICE.

THOMAS CHURCHMAN DARBY, OF CHELMSFORD, AND JOHN EVAN STEEVENSON, OF KING'S LYNN, ENGLAND.

IMPLEMENT FOR CULTIVATING LAND.

SPECIFICATION forming part of Letters Patent No. 466,663, dated January 5, 1892.

Application filed October 7, 1891. Serial No. 408,047. (No model.)

*To all whom it may concern:*

Be it known that we, THOMAS CHURCHMAN DARBY, residing at Chelmsford, in the county of Essex, and JOHN EVAN STEEVENSON, residing at King's Lynn, in the county of Norfolk, England, both subjects of the Queen of Great Britain, have invented certain new and useful Improvements in Implements for Cultivating Land, of which the following is a specification.

The object of this invention is to improve the construction of implements for operating upon a considerable breadth of land at one time.

The invention is represented in the accompanying drawings, in which—

Figure 1:
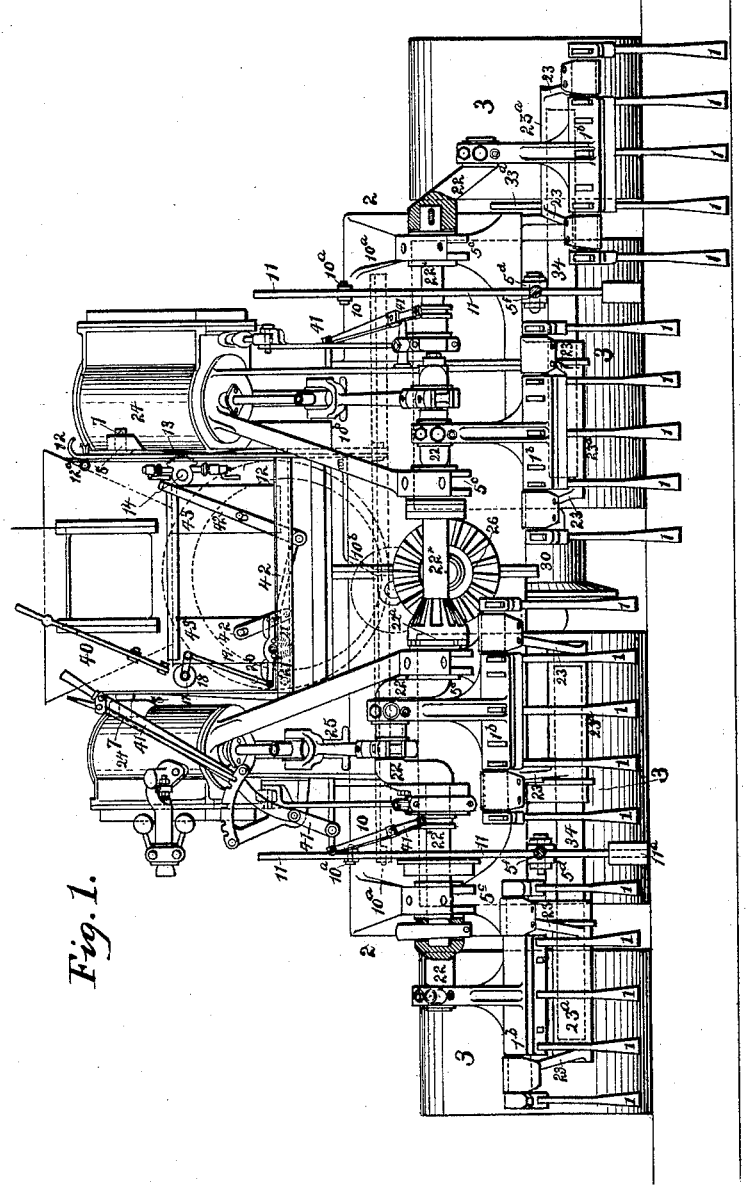
Figure 2:
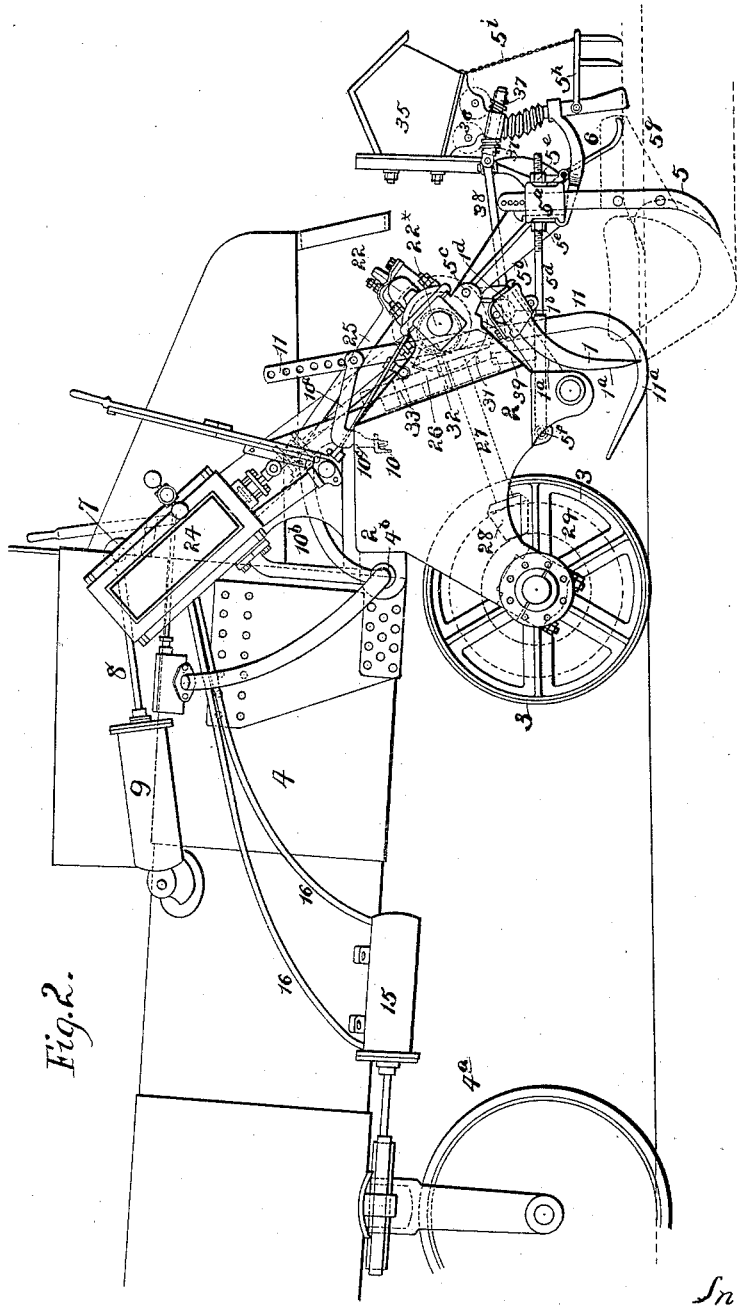

Figure 1 is a rear view, and Fig. 2 is a side view, of a digging or cultivating machine, some of the parts being omitted from each view for the purpose of obtaining clearness in the drawings. Fig. 3 is a side view representing the digging apparatus and its driving mechanism. Fig. 4 is a side view, and Fig. 5 is a rear view, of the mechanism for automatically lifting and lowering the digging frame and tools as the implement passes over uneven ground and for enabling the same to be effected by hand.

The row of forks or cultivating-tools 1, which are to act upon the width of land to be acted upon at one time, we carry by a frame 2 at the rear end of an engine similar to an ordinary agricultural engine, as in digging-machines heretofore proposed.

We make portions of the apparatus carried by the frame 2 detachable, as will be hereinafter described, to allow of the machine traveling on narrow roads, and we support the frame 2 upon broad rollers 3, extending in a line with each other, and the front of the boiler 4 is also supported by a roller or rollers $4^a$, so that together the rollers 3 and $4^a$ pass over and rest upon, as nearly as possible, the whole of the ground which the implement acts on. By supporting the implement on broad rollers in this way the land will be pressed on but lightly. Colters 5 and a hinged plate 6 in the rear of the forks are used to arrest the backward movement of earth.

In order to be able readily to lift the digging apparatus to regulate the depth of working and automatically maintain uniform depth of working when passing over uneven ground, and also to lift the digging-tools 1 entirely off the ground when turning at a headland or traveling past any obstacle, we hinge the frame 2, carrying the digging-tools 1 and their driving-gear, at $4^b$ to the rear end of the boiler 4, so that said frame can turn around the axis of the supporting-rollers 3. The upper end of the frame 2 we attach by pin-joint 7 to the rod 8 of a piston which works in a hydraulic cylinder 9, fixed to the boiler 4. By admitting water under pressure to one end of the cylinder 9 the tools can be raised, or to the other end they can be lowered. The admission of water to either end of the cylinder 9 we control by a slide or other valve, which can be shifted by a rod or lever 12.

We preferably use a hydraulic cylinder 9 on each side of the frame 2; but, if desired, only one may be used.

To automatically maintain uniform depth of working, we employ uprights 11, which are free to rise or fall, and at the bottom are provided with feet $11^a$, which rest upon the ground just in front of the digging-tools. These uprights are attached to levers $10^a$, fulcrumed at $10^c$ and connected to a horizontal bar 10, to which latter is connected a lever $10^b$, which is jointed to the lower end of the rod 12. As the uprights 11 rise or fall they shift the valve 14, and so cause the digging implements to be raised or lowered accordingly. In the arrangement shown in the drawings the forward lever $10^b$ is connected at a point about coincident with the hinge $4^b$ to the vertical sliding rod 12, which latter is provided with a rack to gear with the teeth on the segment-lever 13, operating the hydraulic valve 14.

To raise the implements when turning at a headland, the valve-lever 13 may be moved by hand by simply raising the rod 12 and fixing it in position by a split pin $12^a$. In place of using a hydraulic cylinder to lift or lower the digging mechanism, the shifting of a valve by hand or by the rising and falling of the uprights 11 might be caused to put into action other forms of engine or apparatus to effect the same object. For steering and locking the front wheels we also in some cases use a steam or hydraulic cylinder 15. In the drawings a hydraulic steering-cylinder 15 is used, and it has connected to its ends tubes 16, which are connected at their opposite ends to a valve 17, the lever 18 of which is connected by a link 19 to a treadle 20, which is held in its central or normal position by springs 21, but which can be operated by the attendant's foot from the tender.

In order to enable accurate digging to be performed, we so arrange the digging forks or tines 1 and the rocking levers which control their movements that a straight drive (including the travel of the machine) into the ground is given to the point of the tine, and the tine we make of such a curved form as compensates for the angular and circular motion of the crank end of the fork-head while digging, so that during the downward stroke the front $1^a$ of the tine may bear against the hard ground and keep the machine from running, and also enable digging to be done with much less power than heretofore.

By a properly-constructed mechanism the points of the tines do not commence to descend until in a correct direction for digging, enabling deeper digging to be done with the same crank by starting earlier in the crank-circle and doing away with the necessity for springs and swiveling tine-sockets.

With digging-machines it is necssary that they should be capable of being adapted to treat all kinds of soil, and sometimes the ground will be so hard that only a short spit can be dug with the power at command. Now if the digging-tines 1 are left with the same action as for digging a long spit there will be such a rake or backward movement as to absorb all the power at command, making it nearly as hard to dig a short spit as a long one. We overcome this difficulty by holding the stem of each tine in a socket $1^b$, which is so inclined that when the tine has made about half its downward stroke it (the socket $1^b$) lies in a direction approximately at right angles to the inclined cut that is being made into the ground by the tine. In this way the point of the tine can be brought nearer to or farther from the fulcrum $1^d$ of the arm $1^c$ that carries it and more or less in or out of line with the center of the fulcrum $1^d$ and the center of the crank 22 by shifting the tine endwise in the socket, and the amount of backward rake can so be diminished or increased, as required.

To keep the forks or tines 1 square and prevent any twist coming upon the cranks 22 which work them, we make the arms or connecting-links 23, which control the movements of the forks 1, double, so as to come one on either side of each fork stem or socket $1^b$, and we make them with long bearings. Preferably we form them both in one piece together with a long tubular spindle $23^a$, common to both of them.

In some cases we apply strong colters 5 to the rear end of the frame 2 to resist the upward and forward thrust given by the forks 1 to the machine and to hold the frame 2 down. One way of doing this is to alternate one colter 5 to one tine 1, so that the tines 1 drive the earth by the colters 5, thereby pulverizing the soil, and by making the colters adjustable just so much resistance can be attained as will keep the machine from being unduly pushed forward by the levering action of the forks 1, and as the greater number of the colter-points 5 are laid bare and take a bite of the solid land just before the tines 1 enter a maximum of effect can be attained with a minimum of resistance. The colters 5 are carried by heads or sockets $5^a$ at the end of arms $5^b$, mounted on centers $5^c$, and the depth of the colters is regulated by an adjustable screwed rod $5^d$ and nuts $5^e$, the said rods being pin-jointed to the frame 2 at $5^f$.

In place of using fixed colters for breaking the clods of earth against the tines, revolving colters may be used to effect the same object.

The colters behind the forks may have mold-boards $5^g$ (shown by dotted lines) extending from the rear of them to leave the land in ridges ready for potato or root planting, or for standing through the winter, or for burying green crops, and, if desired, small harrows $5^h$ may be attached to the drill-pipe $35^a$, and by means of chains $5^i$ such harrows may be adjusted or raised entirely off the ground when digging.

24 are the cylinders for driving the crank-shaft $22^*$, and their connecting-rods 25 are coupled up directly onto the crank-shaft, giving motion to the digging-forks 1, thus doing away with any intermediate gear whatever between the cylinders 24 and the digging mechanism, which will reduce friction, and there being no fly-wheel a cushioning action will be given to the forks 1, reducing sudden shocks, and so greatly reducing the risk of breakages caused by tree-roots or large stones. We also drive the rollers 3 from the crank-shaft $22^*$ by means of a bevel-pinion $22^a$ on such shaft, which takes into a bevel-wheel 26 on one end of a cross-shaft 27, the other end of which is provided with a bevel-pinion 28, which takes into a bevel-wheel 29, formed on a box 30, inclosing differential gearing, by which motion is given to the rollers 3 on each side thereof. The bevel-wheel 26 is loose on its shaft; but it has fixed thereto a toothed pinion 31, and is capable of being fixed to rotate with such shaft 27 by means of a pin passed transversely through such wheels 26 and 31 and through a toothed wheel 32, fixed rigidly to the shaft 27. If desired, however, a slower speed can be given to the rollers 3 by interposing change-wheels 33 to communicate motion from the pinion 31 to the toothed wheel 32, in which latter case the pin connecting the wheels 26, 31, and 32 is removed. By the above means the speed at which the rollers 3 are driven may be varied without varying the speed of the forks 1.

Fig. 1 represents the machine arranged for working to its maximum width; but when desired to narrow the machine the outer cranks 22, outer arms 23, with their tubular spindle 23ª, and outer fork stems or sockets 1ᵇ, can be removed from their various axles, and the outer rollers 3 can be unbolted from their carrying disks or flanges 3 3ª. Then by pushing the axles 34 of the tubular spindle 23ª through their bearings until they meet in the middle of the machine the latter is narrowed to the width of the frame 2.

35 is a seed and manure drill, which is carried by the colter-arms 5ᵇ, whose worm-wheels 36 and worm 37 are operated by a rotating shaft 38, which is connected by universal joint to the worm and receives motion by means of the gear-wheel 39, which is driven from the gear-wheel 32.

40 is the starting-lever, 41 the reversing lever and apparatus, and 42 are the levers connected to the fire-doors 43, by which the latter can be opened and closed.

Having fully described our invention, what we desire to claim and secure by Letters Patent is—

1. In implements for cultivating land, the connection of the frame 2, carrying the cultivating implements, by hinge-joints 4ᵇ to the rear of the engine 4, and the connection of the upper part of said frame 2 by pin-joint to the piston-rod 8 of a hydraulic cylinder 9, so that by operating the hydraulic valve-gear the frame 2 may be caused to turn around the axle of the rollers 3 and thereby adjust the depth of work of the forks or lift them entirely off the ground, substantially as herein shown and described.

2. In combination with the parts referred to in claim 1, the uprights 11, resting by their feet 11ª on the ground and communicating motion to the hydraulic valve-gear for automatically lifting and lowering the frame 2 as the implement passes over uneven ground, substantially as herein shown and described.

3. In implements for cultivating land, the coupling up of the engine piston-rods 25 directly with the digger crank-shaft 22*, so as to obtain a direct action of the engine upon the forks, substantially as herein shown and described, and for the purpose stated.

4. In implements for cultivating land, the combination, with the digging-forks 1, of colters behind such forks, substantially as herein shown and described, and for the purpose stated.

5. In implements for cultivating land, the combination, with the digging-forks 1 and colters, of a hinged plate 6 behind the colters, so as to prevent the earth from being thrown too far back when digging at a high speed, substantially as herein shown and described.

6. In implements for cultivating land, the hydraulic cylinder 15, connected with the steering-gear and actuated by a valve 17, operated by a foot-lever 18 on tender, substantially as herein shown and described.

7. In implements for cultivating land, an extended roller-base consisting of the outer crank 22, outer arm 23, tubular spindle 23ª, outer fork-stem 1ᵇ, outer roller 3, axle 34, inner tubular spindle 23ª, and a frame 2, substantially as herein shown and described.

8. In implements for cultivating land, a fork-socket to enable the fork-tines to be adjusted therein, combined with the peculiar arrangement of the fork-head lever 1ᵇ, the axis 34 of the connecting or radius links 23, and the crank-axis 22*, whereby the fork-tines are caused to make a straight cut into the ground and then quickly to rise out therefrom, substantially as herein shown and described.

THOMAS CHURCHMAN DARBY.
JOHN EVAN STEEVENSON.

Witnesses:
B. J. B. MILLS,
CLAUDE K. MILLS,
*Patent Agents, both of 23 Southampton Buildings, London.*